US010385230B2

(12) United States Patent
Großschartner et al.

(10) Patent No.: US 10,385,230 B2
(45) Date of Patent: Aug. 20, 2019

(54) EFFECT PIGMENT PREPARATION

(71) Applicant: SUN CHEMICAL CORPORATION, Parsippany, NJ (US)

(72) Inventors: Dieter Großschartner, Poechlarn (AT); Ingo Giesinger, Nussdorf ob der Traisen (AT); Jonathan Doll, Cincinnati, OH (US); Lisa Clapp, Cincinnati, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 15/723,478

(22) Filed: Oct. 3, 2017

(65) Prior Publication Data

US 2018/0030304 A1 Feb. 1, 2018

Related U.S. Application Data

(63) Continuation of application No. PCT/US2016/027522, filed on Apr. 16, 2016.

(60) Provisional application No. 62/147,855, filed on Apr. 15, 2015, provisional application No. 62/245,352, filed on Oct. 23, 2015.

(51) Int. Cl.
C09D 17/00 (2006.01)
C09D 5/36 (2006.01)
C09D 11/00 (2014.01)
C09C 1/00 (2006.01)

(52) U.S. Cl.
CPC .......... *C09D 17/006* (2013.01); *C09C 1/0021* (2013.01); *C09D 5/36* (2013.01); *C09D 11/00* (2013.01); *C09D 17/00* (2013.01); *C09D 17/004* (2013.01); *C09D 17/007* (2013.01); *C09D 17/008* (2013.01); *C09C 2200/102* (2013.01); *C09C 2200/1054* (2013.01); *C09C 2200/401* (2013.01)

(58) Field of Classification Search
CPC ............ C09C 1/0021; C09C 2200/102; C09C 2200/1054; C09C 2200/401; C09D 11/00; C09D 17/00; C09D 17/004; C09D 17/006; C09D 17/007; C09D 17/008; C09D 5/36
See application file for complete search history.

(56) References Cited

U.S. PATENT DOCUMENTS

| | | | |
|---|---|---|---|
| 4,350,535 A | 9/1982 | Ishijima et al. | |
| 4,565,716 A | 1/1986 | Williams et al. | |
| 4,863,516 A | 9/1989 | Mosser et al. | |
| 5,215,579 A | 6/1993 | Keemer et al. | |
| 5,348,579 A | 9/1994 | Jenkins et al. | |
| 5,470,385 A | 11/1995 | Keemer et al. | |
| 5,494,512 A | 2/1996 | Yamamoto et al. | |
| 6,270,563 B1 | 8/2001 | Herget et al. | |
| 6,398,861 B1 | 6/2002 | Knox | |
| 6,398,862 B1 | 6/2002 | Hechler et al. | |
| 6,503,304 B2 | 1/2003 | Korn et al. | |
| 6,863,718 B2 | 3/2005 | Lamborn et al. | |
| 8,709,146 B2 | 4/2014 | Schlegl et al. | |
| 2003/0097957 A1* | 5/2003 | Lamborn | C09C 1/62 106/14.12 |

FOREIGN PATENT DOCUMENTS

| | | |
|---|---|---|
| EP | 1 256 603 A1 | 11/2002 |
| JP | H10-88026 A | 4/1998 |
| JP | 2002-003745 A | 1/2002 |
| JP | 2002-363440 A | 12/2002 |
| JP | 2003-268260 A | 9/2003 |
| JP | 2003-527461 A | 9/2003 |
| JP | 2004-124069 A | 4/2004 |
| JP | 2010-511757 A | 4/2010 |
| JP | 2010-513619 A | 4/2010 |
| JP | 2010-538096 A | 12/2010 |
| JP | 2011-521090 A | 7/2011 |
| JP | 2014-159583 A | 9/2014 |
| JP | 2016-534215 A | 11/2016 |
| WO | WO 2008/122420 A1 | 10/2008 |
| WO | WO 2015/040537 A1 | 3/2015 |

OTHER PUBLICATIONS

International Search Report and Written Opinion dated Jun. 15, 2016 for Application No. PCT/US2016/027522, 11 pgs.

* cited by examiner

*Primary Examiner* — Shuangyi Abu Ali

(74) *Attorney, Agent, or Firm* — Frost Brown Todd LLC

(57) ABSTRACT

An effect pigment preparation comprises an effect pigment, a dispersive additive, and a passivating agent. The preparation is dry, the pigment comprises about 84% or more of the mass of the preparation, the dispersive additive comprises up to 15% of the mass of the preparation, and the number of theoretical layers of the passivating agent is from about 2 to about 12. The effect pigment preparation is non-dusting and can be easily stirred into aqueous, solvent, or UV curing-based liquid coatings formulations.

15 Claims, No Drawings

EFFECT PIGMENT PREPARATION

CROSS REFERENCE TO RELATED APPLICATIONS

This application hereby claims the benefit of PCT/US2016/027522, of the same title, filed on Apr. 14, 2016, which claimed benefit of the provisional patent application of the same title, Ser. No. 62/147,855, filed on Apr. 15, 2015, and provisional patent application of the same title, Ser. No. 62/245,352, filed on Oct. 23, 2015, the disclosures of which are herein incorporated by reference in their entirety.

BACKGROUND

Effect pigments suffer from potential safety and handling problems. When they are combined with water they can generate hydrogen gas over time which is a problem because of the pressure build up and the flammability of hydrogen gas. In addition, dry effect pigments can form dust which is potentially explosive and a have the potential to cause inhalation and handling problems.

To mitigate the generation of effect pigment dust, many effect pigments are treated with a resin or other additive to make a pellet and/or granules. Unfortunately, the pelletized and/or granulized effect pigment products contain <84% pigment and a significant fraction of additives that must be dissolved prior to incorporation of the pigment into a coating. When additives and resins used to make standard pellet products are incorporated into a coating they can affect how much pigment may be added or they may be incompatible with the desired coating system.

BRIEF SUMMARY

An effect pigment preparation comprises an effect pigment, a dispersive additive, and a passivating agent. The preparation is dry, the pigment comprises about 84% or more of the mass of the preparation, the dispersive additive comprises up to 15% of the mass of the preparation, and the number of theoretical layers of the passivating agent is from about 2 to about 12. The effect pigment preparation is non-dusting and can be easily stirred into aqueous, solvent, or UV curing-based liquid coatings formulations.

These and other objects and advantages shall be made apparent from the accompanying drawings and the description thereof.

DETAILED DESCRIPTION

An effect pigment preparation comprises pigment, dispersive additive, and passivating agent. The preparation is dry, which means it contains less than 5% solvent by weight. In some embodiments, there is less than 2% solvent by weight, such as less than 1% solvent by weight or a negligible amount of solvent. In some embodiments there is no solvent in the effect pigment preparation. The pigment comprises about 84% or more of the weight of the preparation. The dispersive additive comprises up to 15% of the weight of the preparation. The passivating agent is an amount sufficient for about 2 to about 12 theoretical layers.

In some embodiments the solid effect pigment preparation is about 84% or more pigment and can be stirred into both solvent and waterborne coatings and inks formulations without a pigment soaking step. Coating and inks include but are not limited to all solvent and water borne inks, paste inks, UV inks, interior and exterior architectural coatings, automotive coatings, and industrial coatings. A further advantage of the effect pigment preparation is that it is provided in a dry form that does not produce large quantities of dust or contain solvents that would be detrimental to application formulations. Further advantages of the effect pigment preparation, in the case of metallic pigments, is that it shows gassing and corrosion stability in waterborne coatings and shows improved adhesion in both solvent and waterborne formulations.

The effect pigment preparation is non-dusting (or minimally dusting), contains about 84% or more pigment, and can be stirred into water, UV curing and solvent-based coatings and inks systems. The effect pigment preparation comprises one or more effect pigments, one or more dispersive additives, and one or more passivating agents with no (or minimal) residual solvent left in the material. It can be rapidly stirred into both aqueous and solvent borne coating systems, including interior and exterior architectural coatings, automotive coating, and inks. Because the effect pigment preparation is dry and non-dusting, it allows for greater formulation flexibility, and improves the safety characteristics of the pigment.

In some embodiments, the effect pigment preparation can be readily incorporated in all types of liquid coatings and inks systems. Additionally, the effect pigment preparation has excellent universal stir in behavior in water, UV-curing, and solvent-borne compositions. The effect pigment preparation is in the form of a dried material, such as a tablet, pellet, granule, noodle, briquette, or sphere, providing freedom from dust and stability from pigment oxidation or degradation from the atmosphere or other coatings components, such as, for example, water.

An effect pigment is a pigment that exhibits optical effects that are not caused by absorption. Examples of effect pigments include, but are not limited to metallic and pearlescent pigments. The effect pigment in the effect pigment preparation may be one or more effect pigments. The effect pigment preparation may also comprise one or more non-effect pigments.

The total effect pigment loading in the effect pigment preparation is in the range of about 84% to about 99% by weight, with respect to the total weight of the effect pigment preparation, such as about 84% to about 98%, about 84% to about 97%, about 84% to about 95% about 85% to about 99%, about 85% to about 98%, about 85% to about 97%, about 85% to about 95%. In some embodiments, more than one effect pigment is used in the effect pigment preparation. If more than one effect pigment is used in the effect pigment preparation, then the total pigment loading in the effect pigment preparation is in the range of about 85%-99.9%, by weight, with respect to the total weight of the effect pigment preparation, such as about 84% to about 98%, about 84% to about 97%, about 84% to about 95% about 85% to about 99%, about 85% to about 98%, about 85% to about 97%, about 85% to about 95%. In some embodiments, a single effect pigment is used in the effect pigment preparation. In some embodiments, the effect pigment preparation additionally comprises one or more non-effect pigments.

The effect pigment has a specific surface area, which is defined as the amount of surface in $m^2$ there is available per gram of material. In some embodiments, the effect pigment has a specific surface area in the range of about 3 $m^2/g$ to about 55 $m^2/g$, such as about 5 $m^2/g$ to about 55 $m^2/g$, 10 $m^2/g$ to about 55 $m^2/g$, 20 $m^2/g$ to about 55 $m^2/g$, 5 $m^2/g$ to about 50 $m^2/g$, 5 $m^2/g$ to about 45 $m^2/g$, or 5 $m^2/g$ to about 45 m²/g. The specific surface area is measured by the BET (Brunauer-Emmett-Teller) technique, using nitrogen gas adsorption.

In some embodiments, the effect pigment is a metallic pigment that is platelet and/or flake shaped. In some embodiments, the metallic pigment has a d50 (median particle diameter) in the range of about 1 μm to about 500 μm, such as about 5 μm to about 500 μm, about 1 μm to about 400 μm, about 1 μm to about 300 μm, about 1 μm to about 250 μm, about 1 μm to about 100 μm, or about 5 μm to about 100 μm. The d50 is measured by light scattering. In some embodiments, the average thickness (h50) of the metallic pigment is in the range of about 1 nm to about 5 μm, such as about 10 nm to about 5 μm, about 50 nm to about 5 μm, about 1 nm to about 2 μm, about 1 nm to about 1 μm, about 1 nm to about 500 nm or about 10 nm to about 500 nm. The h50 is measured by scanning electron microscopy. The metallic pigment may also be of any type of class of metallic pigment. In some embodiments the shape of the metallic pigment is described for example as cornflake, silver dollar, or vacuum metalized flake (VMP). In some embodiments, pigment is described as leafing or non-leafing.

The metallic pigment may be made of any type of metal or alloy known to those skilled in the art. Suitable metals or alloys used include, but are not limited to, aluminum, copper, copper-zinc alloys, copper-tin alloys, stainless steel, carbon steel, iron, silver, zinc, nickel, titanium, chromium, manganese, vanadium, magnesium, zinc-magnesium alloys, and mixtures thereof. In some embodiments, the metallic pigment comprises lubricant that is residual from its manufacture. Suitable lubricants include, but are not limited to, all types of saturated and unsaturated fatty acids among others.

In some embodiments, the metallic pigment is coated with one or more metal oxides. Metal oxides used to coat the metallic pigment include, but are not limited to, silicon dioxide, titanium dioxide, zinc oxide, zirconium dioxide, tin oxide, cerium dioxide, vanadium oxide, manganese oxide, lead oxide, chromium oxide, iron oxide, aluminum oxide, tungsten oxide, and hydroxides and mixtures thereof. In some embodiments, the coating comprises a hydrated oxide of any one of the aforementioned oxides. In some embodiments, the coating is also doped with an oxide of any one of the aforementioned metals. The thicknesses of the metal oxide layers are variable; in some embodiments the metal oxide layers are partially transparent. In some embodiments, the thickness of the metal oxide layers is in the range of about 20 nm to about 400 nm.

In some embodiments, the effect pigment is a pearlescent pigment. Pearlescent pigments are comprised of a transparent, non-metallic, platelet-shaped substrate that is coated with one or more layers comprising metal oxides having refractive indices. In some embodiments, multiple layers of metal oxides are used; and there is a difference of at least 0.1 in the refractive indices of the consecutive layers. In some embodiments, the pearlescent pigment has an interference color when viewed over a black background. The interference color of the pearlescent pigment may be silver, yellow, gold, cyan, magenta, red, blue, green, violet, and shades of the aforementioned.

The non-metallic platelet substrate can be made of any material that can be used to make a pearlescent pigment, including, but not limited to, natural mica, synthetic mica, bismuth oxychloride, graphite, aluminum oxide, micaceous iron oxide, perlite, silicon dioxide, borosilicate glass, glass, titanium dioxide-coated mica, and iron oxide-coated mica. In some embodiments, the platelet-shaped substrate has d50 in the range of about 1 μm to about 500 μm, such as about 5 μm to about 500 μm, about 1 μm to about 400 μm, about 1 μm to about 300 μm, about 1 μm to about 250 μm, about 1 μm to about 100 μm or about 5 μm to about 400 μm, or about 5 μm to about 100 μm. In some embodiments, the average thickness of the platelet-shaped substrate is in the range of about 5 nm to about 1 μm, such as about 10 nm to about 1 μm, about 50 nm to about 1 μm, about 100 nm to about 1 μm, about 500 nm to about 1 μm, about 5 nm to about 0.5 μm, about 5 nm to about 0.1 μm, or about 5 nm to about 0.05 μm.

In some embodiments, the non-metallic platelet substrate of the pearlescent pigment is coated with one or more layers of a variety of metal oxides. Metal oxides used to coat the non-metallic platelet substrate include, but are not limited to, silicon dioxide, titanium dioxide, zinc oxide, zirconium dioxide, tin oxide, cerium dioxide, vanadium oxide, manganese oxide, lead oxide, chromium oxide, iron oxide, aluminum oxide, tungsten oxide, and hydroxides and mixtures and alloys thereof. In some embodiments, the coating comprises a hydrated oxide of any one of the aforementioned oxides. In some embodiments, the coating is also doped with an oxide of any one of the aforementioned metals. The thicknesses of the metal oxide layers are variable; in some embodiments the metal oxide layers are partially transparent. In some embodiments, the thickness of the metal oxide layers is in the range of about 20 nm to about 350 nm.

The effect pigment preparation comprises a dispersive additive up to about 15% by weight, with respect to the total weight of the effect pigment preparation. Examples of the amount of dispersive additive are in the range of about 0.01% to about 15%, about 0.01% to about 12%, about 0.01% to about 10%, about 0.01% to about 5%, about 0.01% to about 3%, about 0.1% to about 15%, about 0.1% to about 12%, about 0.1% to about 10%, about 0.1% to about 5%, about 0.1% to about 3%, about 0.5% to about 15%, about 0.5% to about 12%, about 0.5% to about 10%, about 0.5% to about 5%, about 0.5% to about 3%, about 1% to about 15%, about 1% to about 12%, about 1% to about 10%, about 1% to about 5%, and about 1% to about 3%. In some embodiments, more than one dispersive additive may be used in the effect pigment preparation.

The dispersive additive imparts stir-in qualities in solvent, UV, and water-borne formulations to the effect pigment. The dispersive additive may be any type of dispersant known to those skilled in the art. In some embodiments, the dispersive additive may be any dispersive additive described as a universal dispersant, a dispersant for water systems, a dispersant for solvent-borne systems, a hyperdispersant, or a dispersant for UV curing systems. The dispersant may be suitable for all types of liquid inks and coatings.

The type and class of dispersive additive is not important, and any dispersive additive compatible with the system for the application and known to those skilled in the art may be used. In some embodiments, the dispersive additive is a surfactant or a polymeric dispersant. Examples of dispersive additive include, but are not limited to, dispersants from the product lines of DisperByk (BYK), Solsperse (Lubrizol), Solplus (Lubrizol), Tego Dispers (Evonik), Tego Wet (Evonik), and EFKA (BASF). Examples of the dispersive additive include, but not limited to, Disperbyk 102, Disperbyk 103, Disperbyk 106, Disperbyk 107, Disperbyk 108, Disperbyk 109, Disperbyk 110, Disperbyk 111, Disperbyk 115, Disperbyk 118, Disperbyk 140, Disperbyk 142, Disperbyk 145, Disperbyk 161, Disperbyk 162, Disperbyk 163, Disperbyk 164, Disperbyk 167, Disperbyk 168, Disperbyk 170, Disperbyk 171, Disperbyk 174, Disperbyk 180, Disperbyk 181, Disperbyk 182, Disperbyk 184, Disperbyk 185, Disperbyk 187, Disperbyk 190, Disperbyk 191, Disperbyk 192, Disperbyk 193, Disperbyk 194N, Disperbyk 199, Disperbyk 2000, Disperbyk 2001, Disperbyk 2008, Disperbyk 2009, Disperbyk 2010, Disperbyk 2012, Disperbyk 2013, Disperbyk 2015, Disperbyk 2022, Disperbyk 2025, Disperbyk 2050, Disperbyk 2055, Disperbyk 2060, Disperbyk 2061, Disperbyk 2096, Disperbyk 2117, Disperbyk 2118, Disperbyk 2150, Disperbyk 2151, Disperbyk 2152, Disperbyk 2155, Disperbyk 2163, Disperbyk 2164, Disperbyk 2200, Tego Dispers 630, Tego Dispers 650, Tego Dispers 652, Tego Dispers 653, Tego Dispers 656, Tego Dispers 660 C, Tego Dispers 670, Tego Dispers 671, Tego Dispers 672, Tego Dispers 685, Tego Dispers 688, Tego Dispers 700, Tego Dispers 710, Tego Dispers 735 W, Tego Dispers 740 W, Tego Dispers 745 W, Tego Dispers 750 W, Tego Dispers 752 W, Tego Dispers 755 W, Tego Dispers 757 W, Tego Dispers 760 W, Tego Dispers 761 W, Tego Wet 240, Tego Wet 250, Tego Wet 251, Tego Wet 260, Tego Wet 265, Tego Wet 270, Tego Wet 280, Tego Wet 500, Tego Wet 505, Tego Wet 510, Tego Wet KL245, EFKA 6220, EFKA 6225, and combinations thereof.

In some embodiments, the dispersive additive is a polymer with an acidic group. In some embodiments, the polymer has a molecular weight of about 100 g/mol to about 5,000,000 g/mol, such as about 1,000 g/mol to about 1,000,000 g/mol. Examples of polymers, include, but are not limited to poly(ethylene), poly(propylene), poly(butylene), poly(isobutylene), poly(isoprene), poly(acetal), poly(ethylene glycol), poly(propylene glycol), poly(butylene glycol), poly(methylmethacrylate), poly(dimethylsiloxane), poly(vinylalcohol), poly(styrene), poly(maleic anhydride), poly(ethylmethacrylate), poly(isobutylmethacrylate), poly(methacrylate), poly(butylmethacrylate), poly(n-butylmethacrylate), poly(vinyl butyrate), poly(vinyl chloride), polysiloxane, and mixtures thereof. The polymers may be random, block, or alternating copolymers. In some embodiments, the polymer is a co-polymer that is made from two or more different monomers, such as the monomers that make the polymers described above. Examples of co-polymers include, but are not limited to polyethers, polyesters, polyamides, acrylics, and polystyrenes. The co-polymer can be alternating monomers, random, or block. Examples include a polyether of alternating or block PEO, PPO groups. Examples of acidic groups include, but are not limited to, carboxylic acids, sulfinic acids, sulfonic acids, phosphonic acids, phosphate esters, maleic anhydrides, and succinic anhydride. In some embodiments, the dispersive additive comprises a group selected from phosphonate, phosphate, phosphite, phosphine, and phosphate ester, such as a phosphate, phosphite, and phosphonic acid. In some embodiments, the acidic group has been converted into a salt.

The effect pigment preparation comprises a passivating agent in the range of 0.01%-14.99% by weight, with respect to the total weight of the effect pigment preparation. In some embodiments, more than one passivating agent is used in the effect pigment preparation. The passivating agent is added to the effect pigment preparation on the basis of the surface area of the effect pigment in the preparation. It is added in an amount so of from about 2 to about 12 theoretical layers, such as about 2.5 to about 12, about 3 to about 11, about 5 to about 11, about 6 to about 11, about 8 to about 11, or about 8 to about 10. The number of theoretical layers of the passivating agent is calculated by equation 1:

$$N = \frac{(x)(N_A)(A_x)}{(y)(MW_x)(SSA_y)} \quad (1)$$

Where N is the number of theoretical layers of the passivating agent on the effect pigment; x is the mass in grams of the passivating agent; $N_A$ is Avogadro's number, equivalent to about $6.022 \times 10^{23}$ mol$^{-1}$; $A_x$ is the area of one molecule of the passivating agent in cm$^2$ assuming a dense packing structure; y is the mass in grams of the effect pigment; $MW_x$ is the molecular weight of the passivating agent; and $SSA_y$ is the specific surface area of the effect pigment in cm$^2$/g.

Examples of a passivating agent, include, but are not limited to phosphate, phosphites, phosphine, phosphate ester, phosphite ester, molybdates, vanadates, chromates, chromites, silanes, and molybdates. In some embodiments, the passivating agent comprises a salt and/or it comprises an organic moiety such as, for example a linear or branched carbon chain, polyether, or polyester of 1-30 carbon atoms, such as 1 to 25, 1-18, 1-12, 2-30, 2-25, and 2-12 carbon atoms. Illustrative examples of the passivating agent include, but are not limited to, triphenyl phosphate, trioctyl phosphate, butyl acid phosphate, octylphosphonic acid, laurel phosphonic acid, octylphosphine, octadecyl phosphine, octadecyl phosphonic acid, Phoschem 10, Phoschem 20, Phoschem 66LF, Phoschem EH, Phoschem PD, Phoschem R-6, Rhodafac ASI 75, Rhodafac ASI 80, Rhodafac ASI 100, Rhodafac LO/529-E, Rhodafac ASI HW, Rhodafac PA 35, Rhodafac RS 610-E, Lubrizol 2062, Lubrizol, 2063, Lubrizol 2064, Skydrol 5, Skydrol LD4, Skydrol PE-5, MCS 352B, Skydrol 500B-4, Solplus D540, Solplus D541, Servoxyl VMUZ 100, Servoxyl VMUZ 6/100, Servoxyl VMUZ 9/100, Servoxyl VPUZ 100, Servoxyl VPGZ 6/100, Servoxyl VPT 3/85, Servoxyl VQHZ 100, Servoxyl VPXZ 100, Servoxyl VPBZ 5/100, Servoxyl VPDZ 100, Servoxyl VPDZ 20/100, Servoxyl VPDP 20/35, Servoxyl VPNZ 9/100, Servoxyl VPFZ 7/100, Servoxyl VPQZ 14/100, Servoxyl VDYZ 100 and other similar compounds.

In some embodiments, the effect pigment preparation additionally comprises a neutralizing agent. The neutralizing agent can be any pH modifier known to those skilled in the art and includes many types of aliphatic amines or amino alcohols. Examples of neutralizing agent include, but are not limited to, ammonia, ethyl amine, diethyl amine, triethylamine, ethanolamine, dimethylethanolamine, ethylendiamine, diethanolamine, triethanolamine, 2-amino-2-methyl-1-propanol, 3-amino-1-propanol, isopropanol amine, 2-amino-1-propanol, 3-amino-2-propanol, and other times of amines known to those skilled in the art.

In some embodiments, the effect pigment preparation additionally comprises a thickener. In some embodiments, the effect pigment preparation additionally comprises a leveling agent. In some embodiments, the effect pigment preparation additionally comprises a plasticizer. In some embodiments, the effect pigment preparation additionally comprises an adhesion promoter. In some embodiments, the effect pigment preparation additionally comprises a defoamer. In some embodiments, the effect pigment preparation additionally comprises a wetting agent. In some embodiments, the effect pigment preparation additionally comprises an anti-settling agent.

The effect pigment preparation is prepared by admixing the effect pigment with the dispersive additive and the passivating agent to form a dispersion. The dispersion is then extruded or compressed to make a tablet, pellet, granule, noodle, briquette, or sphere, and dried at temperatures between 20° C.-150° C. according to methods known to those skilled in the art. The tablets, pellets, granules, noodles, briquettes, or spheres, produced in this way are non-dusting, have a higher pigment loading than typical pellets and can be readily stirred into water, solvent, or UV cured coating compositions.

The effect pigment preparation behaves like a universal pigment and can be readily stirred into all types of liquid coating applications including, automotive coatings, interior architectural coatings, exterior architectural coatings, gravure inks, flexographic inks, paste inks, energy curing (UV or EB) inks, etc. Additionally, the effect pigment preparation may be used in combination with other effect pigment or organic pigments in all ratios.

In some embodiments, a coating or ink composition is obtained by blending the effect pigment preparation with a coating resin. Polyester, polyurethane, polyvinyl, cellulose, polyamide, nitrocellulose, acrylic, alkyd, fluorinated resins, or the like can be used as the coating resin. In some embodiments, the content of the effect pigment in the coating or ink composition is in the range of 0.1% to 50% by weight with respect to the other components of the coating system, such as about 1% to about 40%.

In some embodiments, a coating composition comprises another colored pigment, effect pigment, extender, or dye. Illustrative examples of the color pigment include, but are not limited to, phthalocyanine, iron oxide, quinacridone, perylene, isoindoline, azo lake, chrome yellow, carbon black, and titanium dioxide. Illustrative examples of the effect pigment include, but are not limited to, flake-form pigments of pearlescent mica, aluminum, brass, copper, silica, zinc, aluminum oxide and the like.

In some embodiments, a coating composition may comprise a crosslinker, water, an organic solvent, an interfacial active agent, a hardener, an ultraviolet absorber, a thickener, or a corrosion inhibitor, as well as other additives known in the art.

In some embodiments, the coating is an ink. The effect pigment preparation may be used in any ink including solvent borne, waterborne, and energy curable packaging inks. In some embodiments the effect pigment preparation is used in a packaging ink. The packaging ink may be used to color the interior, the exterior, or both of a package or other container. The effect pigment preparation containing ink may be flexographic, screen, paste, sheetfed, energy cured, gravure, or ink jet.

In some embodiments, the effect pigment preparation is used in a paint. The paint may be used in any type of coating, including refinish and OEM automotive paints, interior and exterior architectural paints, protective paints, and industrial paints.

In some embodiments, the effect pigment preparation is used in a film. The film can be deposited onto a base coat layer or the like, while a topcoat layer may be further formed on the film prepared for the coating composition.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art.

EXAMPLES

Example 1

4.0 g Rhodafac ASI 80 (Solvay Group, Brussels, Belgium) and 0.7 g Disperbyk 192 (BYK, Wessel, Germany) were combined with 1.6 g AMP 95 (Dow Chemical Corporation, Midland, United States) in 2.0 g deionized water. This solution was added to 147.1 g of an aluminum pigment paste in mineral spirits (Benda Lutz® METALLIC 6851, Sun Chemical, Carlstadt, United States, 66% solids) in an attritor mill equipped with an eccentric disc agitator and stirred at 117 RPM. This corresponds to N=3.2 theoretical layers of the ASI 80. The mixture was stirred for 15 minutes and pressed through a die plate to make pellets. The pellets were vacuum dried at 80° C. for 12 hours. The final pigment content of the pellets was approximately 95%.

Example 2

12.5 g Rhodafac ASI 80 (Solvay Group, Brussels, Belgium) and 1.5 g Disperbyk 192 (BYK, Wessel, Germany) were combined with 5.07 g AMP 95 (Dow Chemical Corporation, Midland, United States) in 10.0 g deionized water. This solution was added to 151.5 g of an aluminum pigment paste in mineral spirits (Benda Lutz® LEAFING 1051, Sun Chemical, Carlstadt, United States, 66% solids) in an attritor mill equipped with an eccentric disc agitator and stirred at 117 RPM. This corresponds to N=9.8 theoretical layers of the ASI 80. The mixture was stirred for 20 minutes and pressed through a die plate to make pellets. The pellets were vacuum dried at 80° C. for 12 hours. The final pigment content of the pellets was approximately 89.0%.

Comparative Example 3

The untreated aluminum pigment paste in mineral spirits: Benda Lutz® METALLIC 6851 (Sun Chemical, Carlstadt, United States, 66% solids).

Comparative Example 4

1.49 g Disperbyk 192 (BYK, Wessel, Germany) was combined with 0.15 g AMP 95 (Dow Chemical Corporation, Midland, United States) in 9.9 g deionized water. This solution was added to 150.0 g of an aluminum pigment paste in mineral spirits (Benda Lutz® LEAFING 1081, Sun Chemical, Carlstadt, United States, 66% solids) in an attritor mill equipped with an eccentric disc agitator and stirred at 117 RPM. This corresponds to N=0.0 theoretical layers of the ASI 80. The mixture was stirred for 15 minutes and pressed through a die plate to make pellets. The pellets were vacuum dried at 80° C. for 12 hours. The final pigment content of the pellets was approximately 98.5%.

Comparative Example 5

12.38 g Rhodafac ASI 80 (Solvay Group, Brussels, Belgium) was combined with 5.09 g AMP 95 (Dow Chemical Corporation, Midland, United States) in 9.9 g deionized water. This solution was added to 150.0 g of an aluminum pigment paste in mineral spirits (Benda Lutz® LEAFING 1081, Sun Chemical, Carlstadt, United States, 66% solids) in an attritor mill equipped with an eccentric disc agitator and stirred at 117 RPM. This corresponds to N=11.1 theoretical layers of the ASI 80. The mixture was stirred for 15 minutes and pressed through a die plate to make pellets. The pellets were vacuum dried at 80° C. for 12 hours. The final pigment content of the pellets was approximately 90%.

Comparative Example 6

2.48 g Rhodafac ASI 80 (Solvay Group, Brussels, Belgium) and 1.49 g Disperbyk 192 (BYK, Wessel, Germany)

were combined with 1.02 g AMP 95 (Dow Chemical Corporation, Midland, United States) in 9.9 g deionized water. This solution was added to 150.0 g of an aluminum pigment paste in mineral spirits (Benda Lutz® LEAFING 1081, Sun Chemical, Carlstadt, United States, 66% solids) in an attritor mill equipped with an eccentric disc agitator and stirred at 117 RPM. This corresponds to N=2.2 theoretical layers of the ASI 80. The mixture was stirred for 15 minutes and pressed through a die plate to make pellets. The pellets were vacuum dried at 80° C. for 12 hours. The final pigment content of the pellets was approximately 95%.

Example 7: Evaluation of the Pigments in a Waterborne Ink

A waterborne polystyrene-based ink system was used to evaluate Example 1 and Comparative Example 3. Briefly, 6.0 g Zinpol 146 (Worlee, Lauenberg, Germany), 0.5 g butyl glycol, 1.5 g deionized water were mixed and combined with 0.9 g of the effect pigment preparation of Example 1 and, in a separate experiment, the ink was combined with 1.3 g of the pigment paste of Comparative Example 3 to give equivalent pigment loading. The pigment preparation of Example 1 was incorporated into the ink system without any observable aggregation or agglomeration compared to the untreated aluminum pigment paste of Comparative Example 3. The appearance of the inks was the same.

Example 8: Evaluation in a Waterborne Ink

A waterborne system was used to evaluate Example 2. Briefly, 21 g of the effect pigment preparation of Example 2 was mixed with 28 g deionized water and 51 g of a water based film forming emulsion (Paracryl 8996, Para-Chem, South Bend, Ind., United States). The ingredients were mixed at 2100 RPM for 20 min using a standard paddle type mixer. The mixture was drawn down on a black and white sheet of Leneta paper using a #4 K-bar. The drawn down material had no observable aggregates and an excellent metallic finish.

Example 9: Stability Test

Approximately 20 g of the effect pigment preparation in Examples 1 and 2 was combined with 50 mL butyl glycol and 50 mL deionized water in a 300 mL Erlenmeyer flask and mixed for 5 minutes. This apparatus was placed in a water bath at 40° C., sealed and connected to a sealed gas burette that was filled with deionized water. After a 30 minute incubation, the valve on the burette was opened and the hydrogen gas evolving from the sample was allowed to enter the burette and displace the water. Upon opening the gas burette, the test has an initial pressure equilibration to yield approximately 40 mL of gas. The test continued for 30 days and the amount of gas generated over this period was recorded. An identical experiment was done using the untreated pigment paste of Comparative Example 3. Table 1 shows the gas evolution from Examples 1, 2 and Comparative Example 3 at 0 days, 10 days, 20 days and 30 days. As shown by this data the untreated pigment of Comparative Example 3 and the incompletely treated pigments of Comparative Examples 4-6 were much more unstable than the effect pigment preparations of Examples 1 and 2 with respect to gas evolution.

TABLE 1

Gas evolution data for Example 1 and Comparative Example 2.

| Sample | Volume of $H_2$ gas generated - 10 days (mL) | Volume of $H_2$ gas generated - 20 days (mL) | Volume of $H_2$ gas generated - 30 days (mL) |
| --- | --- | --- | --- |
| Example 1 | −5.0 mL | −5.0 mL | −5.0 mL |
| Example 2 | 16.4 mL | 15.0 mL | 21.0 mL |
| Comparative Example 3 | >80 mL, Sample failed after 8 hours | >80 mL, Sample failed after 8 hours | >80 mL, Sample failed after 8 hours |
| Comparative Example 4 | >80 mL, Sample failed after 8 hours | >80 mL, Sample failed after 8 hours | >80 mL, Sample failed after 8 hours |
| Comparative Example 5 | >80 mL, Sample failed after 8 hours | >80 mL, Sample failed after 8 hours | >80 mL, Sample failed after 8 hours |
| Comparative Example 6 | >80 mL, Sample failed after 8 hours | >80 mL, Sample failed after 8 hours | >80 mL, Sample failed after 8 hours |

Example 10: Evaluation of the Pigments in a Solvent-Borne Coating 6.7 g of the effect pigment preparation of Example 1 was mixed into 100 g of a solvent borne, cellulose acetate butyrate/acrylate resin along with 43.3 g butyl acetate to make 150 g of a finished paint. Similarly, 9.4 g of the pigment paste of Comparative Example 3 was soaked in 9.4 g of butyl acetate for thirty minutes. The soaked mixture was combined with 100 g of a solvent borne, cellulose acetate butyrate/acrylate resin and an additional 31.0 g butyl acetate to make 150 g of a finished paint. The effect pigment preparation of Example 1 was incorporated into the paint system in a much easier fashion than the pigment paste of Comparative Example 3. In addition, incorporation of Example 1 into the coating did not require any pre-dispersion step before using it in a coating as was required by Comparative Example 3.

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. An effect pigment preparation comprising:
    an effect pigment,
    a dispersive additive, and
    a passivating agent,
    wherein the preparation comprises less than about 5% solvent, the pigment comprises about 84% or more of the mass of the preparation, the dispersive additive comprises up to about 15% of the mass of the preparation, and the number of theoretical layers of the passivating agent is from about 2 to about 12, wherein the pigment comprises aluminum metal.

2. The effect pigment preparation of any of claim 1, wherein the preparation is in the form of a tablet, pellet, granule, noodle, briquette, or sphere.

3. The effect pigment preparation of claim 1, wherein the pigment s a pearlescent pigment.

4. The effect pigment preparation of claim 1, wherein the pigment is coated by a metal oxide selected from silicon dioxide, titanium dioxide, zinc oxide, zirconium dioxide, tin oxide, cerium dioxide, vanadium oxide, manganese oxide, lead oxide, chromium oxide, iron oxide, aluminum oxide, tungsten oxide, and hydroxides and mixtures thereof.

5. The effect pigment preparation of claim 1, wherein the dispersive additive is selected from a surfactant and a polymeric dispersant.

6. The effect pigment preparation of claim 1, wherein the dispersive additive is a polymer with an acidic group.

7. The effect pigment preparation of claim 1, wherein the dispersive additive comprises a group selected from a phosphonate, phosphate, phosphite, phosphine, and phosphate ester.

8. The effect pigment preparation of claim 1, wherein the dispersive additive comprises a co-polymer.

9. The effect pigment preparation of claim 1, wherein the passivating agent is selected from phosphate, phosphites, phosphine, phosphate ester, phosphite ester, molybdates, vanadates, chromates, chromites, silanes, and molybdates.

10. The effect pigment preparation of claim 1, wherein the passivating agent is a salt.

11. The effect pigment preparation of claim 1, wherein the passivating agent comprises a linear or branched carbon chain of 1-30 carbon atoms.

12. The effect pigment preparation of claim 1, wherein the number of theoretical layers of the passivating agent is from about 3 to about 11.

13. A coating composition comprising the effect pigment preparation of claim 1.

14. A solvent borne ink composition comprising the effect pigment preparation of claim 1.

15. A waterborne ink composition comprising the effect pigment preparation of claim 1.

* * * * *